INVENTOR.
LUKE J. GOVERNALE
ALBERT B. HORN, Jr.
HARRY E. O'CONNELL
BY
Kenneth Swartwood

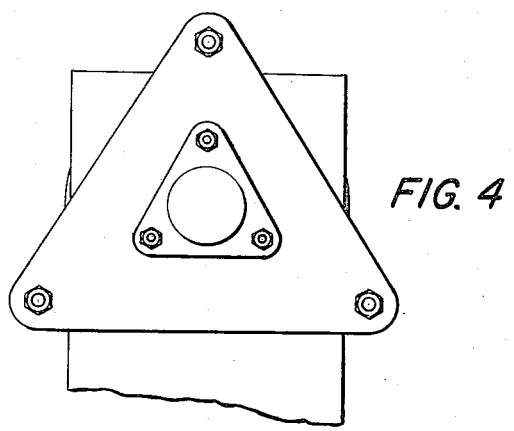
FIG. 4
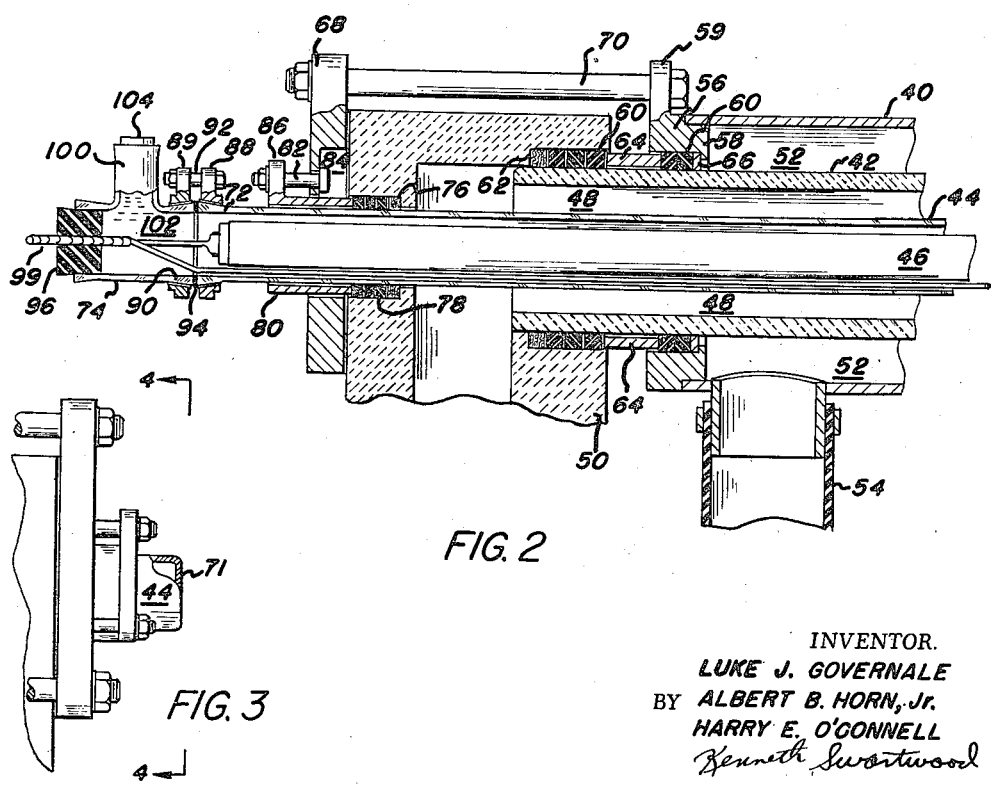
FIG. 2
FIG. 3

INVENTOR.
LUKE J. GOVERNALE
BY ALBERT B. HORN, Jr.
HARRY E. O'CONNELL
Kenneth Swartwood Patented Dec. 8, 1953

2,662,186

UNITED STATES PATENT OFFICE 2,662,186

TWO-STAGE PHOTOCHEMICAL REACTOR

Luke J. Governale, Albert B. Horn, Jr., and Harry E. O'Connell, Baton Rouge, La., assignors to Ethyl Corporation, New York, N. Y., a corporation of Delaware Application January 23, 1952, Serial No. 267,812

7 Claims. (Cl. 250—47)

This invention relates to an apparatus for conducting a photochemical reaction and more particularly but not exclusively to an apparatus for commercial manufacture of benzene hexachloride (1,2,3,4,5,6-hexachlorocyclohexane) from benzene and chlorine in the presence of actinic light.

Benzene hexachloride is an important commercial insecticide. However, the crude benzene hexachloride formed in the photochemical reaction of benzene and chlorine consists of several space isomers, only one of which, namely the gamma, is insecticidally active to any appreciable extent. The latter isomer is formed in most commercial operations as a relatively small fraction of the total weight of the benzene hexachloride product.

It has been found that the temperature of the reaction has a rather marked influence upon the distribution of the several isomers in the benzene hexachloride product. In general, experience has indicated that lower temperatures favor the yield of the gamma isomer. For example, a decrease in temperature within the reaction zone of approximately 20° F. (about 11° C.) increases the yield of the gamma isomer approximately 1 percent. Since the gamma isomer is normally formed in relatively low percentages, an increase of one percent of the total yield is tremendously important since this increase results in approximately a tenfold increase in the production of the valuable gamma isomer.

The above reaction to form benzene hexachloride is an exothermic reaction and, thus, the throughput capacity for any given reactor and the optimum temperature conditions employed within the reactor must be balanced economically against the cost of suitable refrigerating equipment.

At the present time, a large part of the commercial production of benzene hexachloride is produced in pipe-type continuous reactors formed of fluosilicate glass or similar material using one or more lighting units, such as fluorescent tubes, positioned parallel with and externally of the reactor. Most commercial operations have employed cascade-type water cooling means. In general, the throughput capacity of such reactors, relative to the volume of reaction zone, has been excessively low and, in addition, it has normally not been possible even with such limited capacity to operate below the boiling point of benzene. In consequence, the gamma content of the product has normally not exceeded 13 weight percent of the total production.

The reaction rate of the process is a function of the light intensity within the reactor. Using external lighting, the light tends to be concentrated at localized points and thus the reaction tends to be distributed unevenly within the reactor. This condition has resulted in localized heating within the reactor, with a consequent reduction in the yield of the valuable gamma isomer.

The prior benzene hexachloride reactors have also been hazardous in operation. The hot benzene and chlorine reactants are explosive in the presence of oxygen and no convenient means susceptible to easy and ready maintenance could be provided for protecting the glass reaction tubes against breakage or for isolating the system from air in case of a break in one of the tubes.

It is accordingly an important object of the present invention to provide an apparatus for conducting a photochemical reaction in which the actinic light required to activate the reaction is distributed uniformly and completely to the reactants throughout the entire reaction zone.

Another object of this invention is to provide an apparatus of the above type which is provided with novel structural features that facilitate rapid and efficient heat conductance from the reaction mass to the cooling medium so as to maintain a relatively low temperature in the reactor while employing relatively simple and economical refrigerating or cooling equipment.

Still another object of this invention is to provide an apparatus in which a portion of the product of the reactor and preferably a major portion thereof may be recycled through the reaction zone and in which the remaining portion of the products of the reactor may be further reacted in a second reaction zone to carry the reaction essentially to completion.

Another object is to provide a reaction apparatus provided with a central light well disposed axially within the reactor tube and in which the wall of the light well forms an inner boundary defining an annular reaction zone.

Still another object is to provide an inert electrically insulating liquid medium within the light well to provide protection against an explosion in the event of a crack or break in the walls of the light well by preventing contact of the explosive reactants with air or with the electrical wires and terminals within the light well.

Another object is to provide a reaction tube of the above type which is provided with means to prevent automatic starting or excitation of a fluorescent tube within the light well when the light is inoperative.

Another object of this invention is to provide a metal protective shell surrounding the reaction tube and further to provide a means for signalling when one of the fluorescent lights is not in operation.

Another object of this invention is to provide an apparatus which is characterized by its simplicity in construction, safety in operation and the ease with which the apparatus may be assembled and disassembled.

Other objects and advantages of the present invention will become more apparent as the description proceeds especially when considered in connection with the accompanying drawings, wherein:

Figure 2 is a fragmentary enlarged sectional view taken on a plane indicated by the line 2—2 of Figure 1 and looking in the direction indicated by the arrows;

Figure 3 is a fragmentary elevational view, partly in section, taken substantially on the line 3—3 of Figure 1;

Figure 4 is a fragmentary elevational view taken on the line 4—4 of Figure 3.

Before explaining the present invention in detail, it is to be understood that the invention is not limited in its application to the details of construction and arrangement of parts illustrated in the accompanying drawings, since the invention is capable of other embodiments or of being practiced or carried out in other ways. Also, it is to be understood that the phraseology or terminology employed herein is for the purpose of description and not of limitation.

Figure 1:
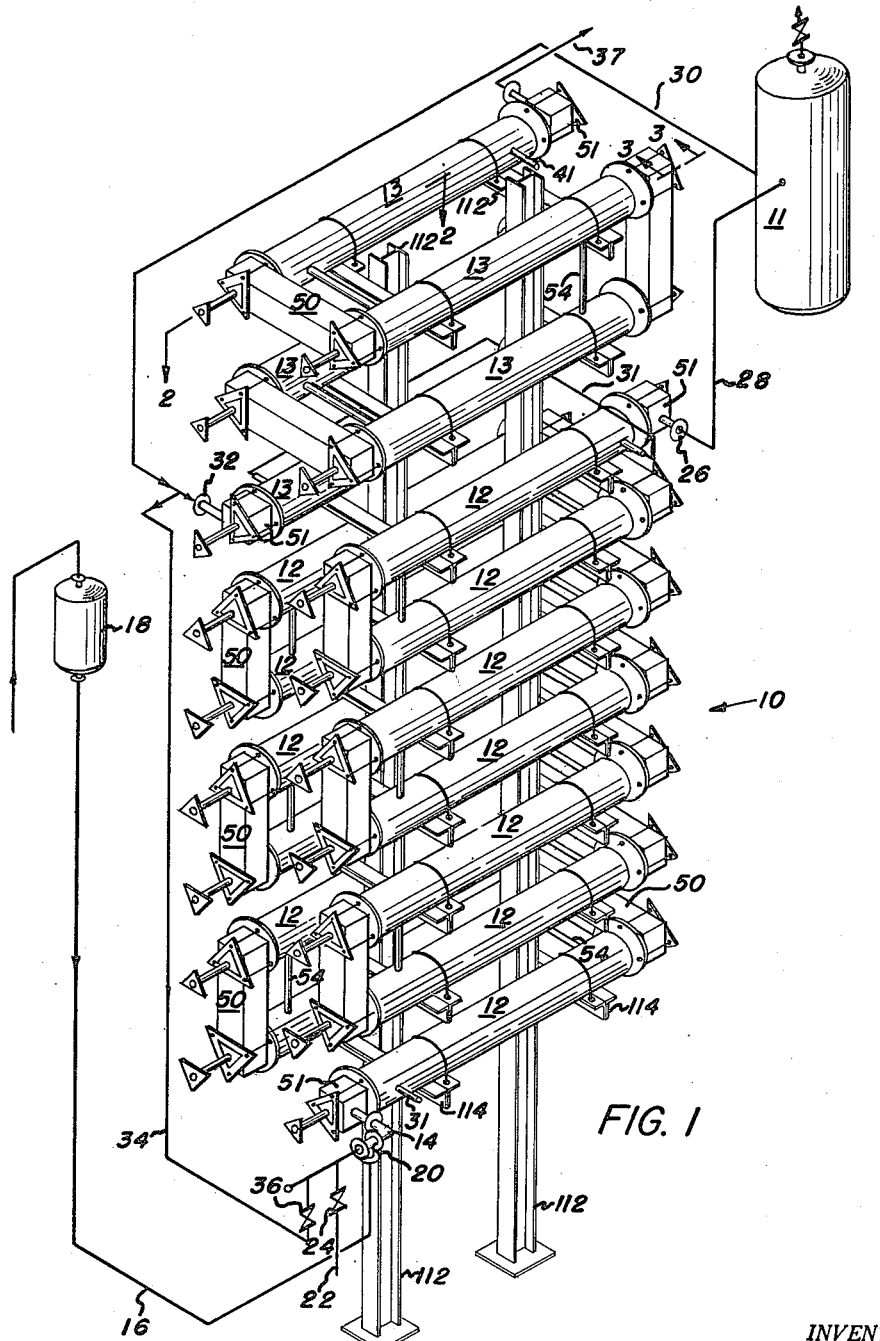
Figure 1 is an isometric view illustrating an apparatus for the manufacture of benzene hexachloride and embodying the features of the present invention.

The apparatus illustrated in the drawings is suitable for carrying out any photochemical reaction, but is designed especially for the production of benzene hexachloride from benzene and chlorine. As shown particularly in Figure 1, the apparatus comprises a plurality of reaction tubes 12 and 13 interconnected to form a primary and a secondary reactor section therein, and a reactor recycle holdup drum 11. The primary reactor section includes the first twelve (12) reaction tubes 12, considering zig-zag upward flow, and the secondary reactor section including the remaining five (5) reaction tubes 13 at the top of the reactor 10.

Chlorine and benzene are continuously fed into the inlet end 14 of the primary reactor section. The chlorine feed line 16 includes a chlorine surge tank 18 and enters the inlet 14 through the T connector 20. Benzene enters the primary reactor from the benzene line 22, passing through the valve 24.

The outlet end 26 of the primary reactor is connected by the line 28 to a central part of the reactor recycle drum 11. The latter is a cylinder providing a reservoir for reaction products from the primary reactor, generally a 70-95 percent converted chlorine, benzene and benzene hexachloride solution.

The reactor recycle drum is connected by line 30 to the inlet end 32 of the secondary reactor section and also, through the recycle line 34 to the inlet end 14 of the primary reactor section. A valve 36 controls the flow of recycle to the primary reactor section, which flow is generally a major portion of the total product solution from the primary reactor section. The product of the second reactor section is recovered through the line 37 and is pumped to any suitable recovery system.

The chlorine surge tank 18 is provided in the chlorine line to prevent a back-flow of benzene into the chlorine feed line during a shut down of the process apparatus or in the event of an unexpected interruption of the chlorine feed. Due to the solubility of chlorine in benzene, when the flow of chlorine is stopped, the benbene reactant solution will tend to fill the chlorine feed line. The surge tank 18 is preferably of sufficient capacity to contain essentially all of the reactant solution within the combined reaction zones of the reactor tubes 12.

Te details of construction employed in each of the tubes 12 and 13 are shown in Figures 2-4 inclusive. As illustrated therein, each tube comprised an elongated cylindrical shell 40 constructed of a rigid material, such as steel; a heat conductive reaction pipe 42 disposed concentrically within the shell and formed of resin-impregnated graphite material or the like; and a translucent or transparent tube 44 within the heating conductive pipe 42 disposed centrally therein and providing a protective housing for the fluorescent light source 46. An annular reaction zone 48 is thus provided between the walls of the pipe 42 and the protective tube 44 which is connected in series with similar annular reaction zones in the other tubes 12 of the reactor 10 through a passage in connector L's 50.

The connector L's 50, and also the connector units 51 at the inlet and outlets of the primary and secondary reactor sections, are preferably also formed of a resin-impregnated graphite material, and are normally machined to provide suitable inlet and outlet ports as well as an opening through which the translucent tube is adapted to pass.

An annular coolant chamber 52 is formed in each of the reactor tubes 12 and 13 by the walls of the shell 40 and the conductive pipe 42. The coolant chambers of each pipe 12 and 13 are connected in series with similar coolant chambers in the other tubes by the connector conduits 54. Coolant enters through the line 31 and leaves the system through the line 41. The coolant is transferred from the primary reactor section to the secondary reactor section through the line 33 (see Figure 1). The connector conduits 54 are preferably formed of a resilient material, such as rubber.

As shown particularly in Figure 2, a flanged ring 56 is provided with an extension 58 adapted to extend into the shell 40 and is sealed therewith by welding or other suitable means.

The heat conductive tube 42 extends beyond the end of the shell 40 at each end thereof and projects into the connector L's 50. Suitable ring seals 60 and packing 62 provide a seal between the reaction zone 48 and the atmosphere and the coolant chamber 52. An annular spacer 64 and a gland ring 66 retain the seals in assembled position. The seals may be formed of rubber, synthetic rubber or the like and the packing may be of any suitable material which is inert to the reaction solution.

A triangular flange retaining plate 68 is disposed on the outer side of the connector L 50 at each end of the reactor tubes 12 and 13. Three (3) bolts 70 pass through openings in the flange 59 of the ring 56 and the triangular retaining plate 68 and secure the connector L's to the shell 40. The bolts 70 retain the seals under compression and prevent leakage of reaction solution from the reaction zone and of cooling medium from the chamber 52.

The protective translucent tube 44 extends beyond both ends of the heat conductive pipe 42 and beyond the end of the connector L's 50. One end 71 of the protective tube is sealed (see Figure 3) whereas the opposite end 72 thereof joins with a T connector 74 (see Figure 2). The connector L's 50 are sealed with the translucent protective tube 20 at opposite ends by means of suitable packing and resilient annular rings 76 and 78 respectively. The latter are maintained under compression by means of a cylindrical sleeve 80 which in turn is secured to the triangular retaining plate 68 by bolts 82. The latter bolts are each provided with an enlarged head disposed within a recess 84 in the triangular retaining plate 68 and extend through openings in a flange 86 in the cylindrical sleeve 80.

The open end 72 of the translucent protective tube 44 is flared outwardly and cooperates with a mating annular retaining ring 88. A second annular retaining ring 89 mates with an outwardly flared end 90 of the T connector 74 and is joined to the first annular retaining ring by means of three bolts 92 (only one shown). A gasket 94 seals the T connector 74 with the protective tube 44 and is maintained under compression by the bolts 92.

The T connector 74 is provided with a stopper 96 which is inserted within its open end (shown at the left end in Figure 2). The stopper is preferably formed of a resilient material, such as polyethylene rubber and the like, and tightly seals the opening within the translucent tube 44. Two fluorescent tubes 46 (see also Figure 7) are placed end to end within the tube 44 and the electrical wiring 99 connected to both ends of each tube pass through the central opening in the stopper 96 and are sealed thereby.

The fluorescent tubes preferably merely lay within the translucent tube 44 and are inserted through the T connector when the stopper 96 is removed. When it is desired to remove the fluorescent tubes, such as to replace a burned-out unit, the fluorescent tubes are drawn out of the translucent tube 44 by means of the electrical wiring 99.

The T connector 74 is also provided with a fluid inlet neck 100, through which a transformer oil 102 or similar fluid may be poured to fill the voids remaining within the translucent tube 44. A resilient stopper 104 is provided to close the opening in the neck 100 during normal operation of the apparatus.

The transformer oil is non-conducting and preferably has a relatively low melting point. A transformer oil consisting principally of trichlorobenzene has been found highly suitable for filling the tube 44. One main purpose for maintaining an insulating medium surrounding the fluorescent tube is to prevent or at least minimize the possibility of an explosion. For example, should the translucent tube 44 crack, the reactant solution of benzene and chlorine would normally tend to seep into the light well. With the electrical wiring and connections therein, an explosion would result. Accordingly, by maintaining an inert liquid within the light well, seepage of reactants thereinto and the danger of explosion are substantially eliminated. In addition, this transformer liquid prevents the entry of air into the tube, which air would increase the danger of an explosion in the event of a break in one of the tubes.

The danger of explosion, as discussed above, is particularly critical should both the translucent protective tube 44 and the fluorescent bulb 46 break. With conventional fluorescent lighting systems, the initiating circuit of the bulb would automatically attempt to re-ionize the gas within the bulb. Thus, were reactant solutions permitted to enter the broken bulb and contact this initiator circuit, an explosion would result.

Figure 7:
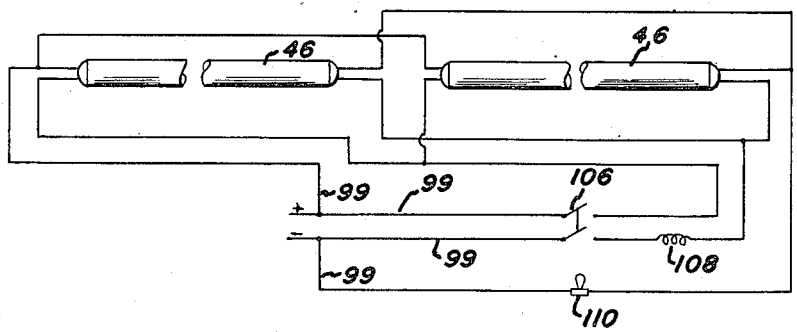
Figure 7 is a schematic wiring diagram illustrating the electrical circuit for operation of a set of two lights in one reaction tube.

The present invention provides a means whereby this additional danger is eliminated by preventing automatic re-excitation of the light bulb, once it has been extinguished. With particular reference to Figure 7 of the drawings, a circuit is illustrated for operating two fluorescent tubes 46 disposed end-to-end within one reactor tube 12. The tubes 46 are connected in parallel. The initiating circuit is manually controlled by the switch 106 and includes a ballast coil 108 for reducing the line voltage to the light units. A warning light 110, preferably a small fluorescent tube, is provided in the main circuit. This warning light is preferably positioned on a control panel, along with a similar warning light for the lights in the other reactor tubes 12 and 13, so as to immediately signal when one of the units is inoperative.

Figure 6:
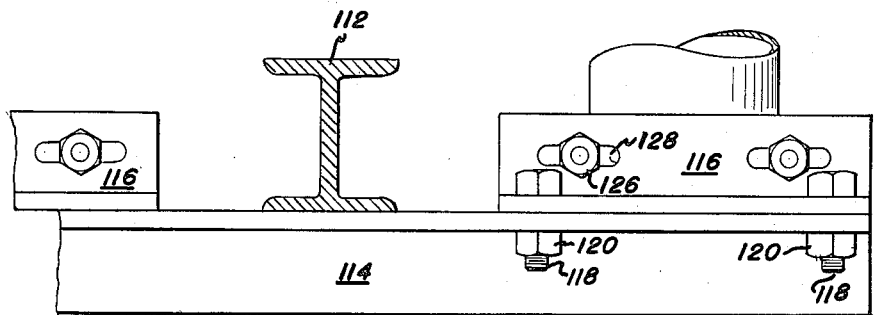
Figure 6 is a sectional view taken substantially on a plane indicated by the line 6—6 of Figure 5.
Figure 5:
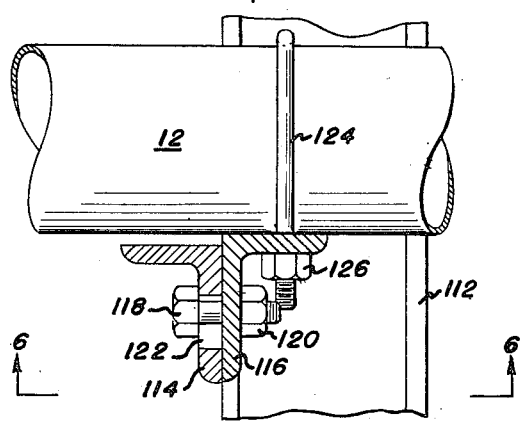
Figure 5 is a sectional view showing a means for supporting the reaction tubes in assembled relation.

Due to the length of the reactor tubes, and particularly, due to the relatively fragile nature of the resin-impregnated graphite pipes 42, and the glass pipe 44, considerable care must normally be exercised in assembling and servicing the reactor 10. A supporting apparatus for the individual reactor tubes 12 is illustrated in Figures 5 and 6 of the drawings. This apparatus provides considerable flexibility during assembly of the apparatus by allowing accurate alignment of the individual tubes and thus preventing the buildup of undesired stresses in the fragile parts thereof. In this novel construction, two vertically disposed beams 112 are positioned between the horizontally aligned reaction tubes and spaced apart a distance somewhat less than the length of the tubes 12 and 13. Each beam is provided with a cross support 114 for each horizontally-aligned reaction tube pair. As shown in Figure 6, this support is an angle iron, although other structural members may also be employed. The ends of the cross support extend beneath and beyond the reaction pipes 12 and 13 and support an adjustable bracket 116 for each reaction pipe. The latter is also formed of angle iron stock and is adjustably secured to the cross support by means of a bolt 118 and a nut 120. The cross support 114 is provided with a vertically extending elongated slot 122 which permits limited vertical movement of the bracket 116 upon loosening of the nut 120.

The reaction tubes 12 and 13 are secured to the adjustable bracket 116 by means of U-shaped rods 124 and nuts 126. The tubes 12 and 13 are adjustable in a horizontal plane relative to the bracket by virtue of the elongated slots 128 in the bracket 116 when the nuts are loosened.

In the operation of the apparatus of this invention, chlorine is passed into the inlet end 14 of the primary reactor section through the line 16. Benzene from the line 22 and a recycle solution from the line 34 mixes with the chlorine and preferably completely dissolves the same. Generally, the weight of recycled solution is a multiple of the weight of fresh benzene and chlorine feed. The resulting reactant solution is pumped upwardly from one U-shaped reactor unit to the next unit through the resin-impregnated connector L's and is removed from the primary reactor section of the reactor through the line 28 to the recycle holdup drum 11. The major portion of the reaction is carried out in this section. A fraction of this reaction mixture, and generally a minor fraction thereof, is passed into the inlet end 32 of the secondary reaction section wherein the remaining unreacted chlorine is reacted with benzene. The product from this secondary reactor section is removed through the line 37. Water or other coolant is circulated concurrently through the various coolant chambers, entering through the inlet 31, and passing from one reaction tube 12 and 13 to the next reaction tube through the flexible coolant conduits 54. The coolant is transferred from the primary reactor to the secondary reactor through the coolant line 33. The coolant is removed from the system through the pipe 41.

As is believed apparent from the foregoing, the present invention discloses an apparatus for conducting a photochemical reaction in which the light is uniformly and completely distributed to the reactants throughout the entire reaction zone. The fluorescent light tubes are disposed centrally within an annular reaction zone so that all of the light rays from the fluorescent tubes are efficiently used and the reactants in all parts of the zone have a substantially uniform reaction rate. By this construction the number of fluorescent light tubes necessary for any given reactor is maintained at a minimum.

By virtue of the annular configuration of the reaction zone, a relatively large cooling surface area is provided per unit volume of reaction zone. Thus, rapid and efficient heat conductance from the zone is obtained while employing relatively simple and economical refrigerating means. Accordingly, even at maximum production, the reaction temperature within the zone may be maintained at reasonably low temperatures, preferably about 30° C., so that high concentrations of gamma benzene hexachloride are obtained in the product. The present apparatus also permits the carrying out of the reaction to form benzene hexachloride in two stages so as to obtain optimum reaction conditions in both the high reaction rate, high heat evolution portion of the reaction, and also in the relatively low reaction rate chlorine clean-up portion of the reaction. The reaction may thus be conducted with a minimum of contact time while, at the same time, producing a high gamma content benzene hexachloride product.

The present apparatus provides a number of safety features so as to prevent explosion of the reactants in the event of breaking or other failure of the apparatus. One feature involves the use of an inert transformer oil within the light well so as to prevent the flow of air or reactants thereinto in the event of breakage of the light transmissive tube and subsequent contact thereof with the electrical wiring or terminals therein. Another safety feature of the apparatus is the provision of a cooling chamber surrounding the reaction zone such that the reaction zone will be flooded with water and the reactants will be isolated from contact with air in the event of breakage of the heat conductive resin-impregnated graphite tube. Another safety feature inherent in this novel apparatus is the provision of a rigid metal shell surrounding the light reaction tube. Still another safety feature of this invention involves the provision of a warning light which will signal in the event of failure of any one of the fluorescent lights and the provisions of a manual switch for initiating lighting of the fluorescent tubes so as to eliminate the possibility of automatic excitation of the tube upon breakage of the heat conductive pipe and fluorescent tube.

The present invention also permits the use of an efficient heat conductive tube, such as resin-impregnated graphite, in place of the relatively poor heat conductive glass or similar light transmissive material, by disposing the light well centrally within the reaction zone and the coolant chamber externally of the reaction zone.

This apparatus also provides a very simple supporting structure for the reaction tubes which provides considerable flexibility in assembly of the individual tubes so as to prevent any undesired stresses or strains within the brittle and fragile component parts of the reactor tubes.

We claim:

1. An apparatus for conducting an exothermic photochemical reaction comprising a light unit, a translucent tube surrounding said light unit, a heat conductive pipe surrounding said translucent tube and forming therewith an annular reaction zone for carrying out said reaction and a rigid metal shell surrounding said heat conductive pipe and forming therewith an annular coolant chamber for removing the heat generated in said reaction.

2. An apparatus in accordance with claim 1 and being further characterized in that said translucent tube is filled with an inert non-conducting liquid and in that one end of said transparent tube is provided with a closure member for insertion or removal of said light unit and also for filling the space surrounding said light unit with said liquid.

3. An apparatus for conducting a photochemical reaction in accordance with claim 1 and being further characterized in that said light unit is a fluorescent tube and in that an electrical circuit is provided for operating said fluorescent tube including a warning light disposed externally of said transparent tube and adapted to provide a signal in the event said fluorescent light tube is inoperative.

4. An apparatus for conducting a photochemical reaction in accordance with claim 3 and being further characterized in that a manually operated excitation circuit is provided for initiating the operation of said fluorescent light tube.

5. An apparatus for conducting a photochemical reaction between a liquid and a gaseous reactant comprising a plurality of vertically spaced, interconnected reactor tubes, each tube comprising a source of actinic light, a glass tube surrounding said light, a resin-impregnated graphite pipe surrounding said glass tube and forming therewith an annular reaction zone, a rigid metal shell surrounding said graphite pipe and forming therewith an annular coolant chamber, an inlet line for introducing said liquid reactant into said annular reaction zone, an inlet line for introducing said gas reactant into said annular reaction zone, a gas surge tank having a volumetric capacity at least as great as said reaction zone and adapted to prevent a back-flow of reactants to said gas source, and a supporting structure for said reactor tubes including a pair of uprights, a cross support rigidly secured to each upright for each vertically spaced reactor tube, a bracket secured to each of said cross supports and adjustable relative thereto in a vertical plane and a mounting member for each said reactor tubes for securing said tubes to said bracket, said mounting member being adjustable relative to said bracket in essentially a horizontal plane.

6. An apparatus for conducting an exothermic photochemical reaction comprising a light unit, a translucent tube surrounding said light unit, a heat conducting pipe surrounding said translucent tube and forming therewith an annular reaction zone for carrying out said reaction and a rigid shell surrounding said heat conductive pipe and forming therewith an annular coolant chamber for the heat generated in said reaction.

7. An apparatus in accordance with claim 6, wherein a gas feed line is provided for introducing gas from a gas source into said reaction zone and a gas surge drum is also provided in said gas feed line having a volumetric capacity at least equal to the volumetric capacity of said reaction zone and adapted to prevent a back flow of reactants to the gas source.

LUKE J. GOVERNALE.
ALBERT B. HORN, Jr.
HARRY E. O'CONNELL.

References Cited in the file of this patent

UNITED STATES PATENTS

| Number | Name | Date |
|---|---|---|
| 1,520,506 | Payne et al. | Dec. 23, 1924 |
| 2,458,691 | Dorsky et al. | Jan. 11, 1949 |
| 2,528,320 | Roberts et al. | Oct. 31, 1950 |
| 2,607,723 | Pinafetti et al. | Aug. 19, 1952 |